Dec. 9, 1958 C. B. SPASE 2,863,543
TORQUE METERING CLUTCH
Filed Feb. 14, 1957 2 Sheets-Sheet 1
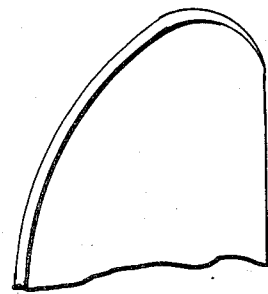
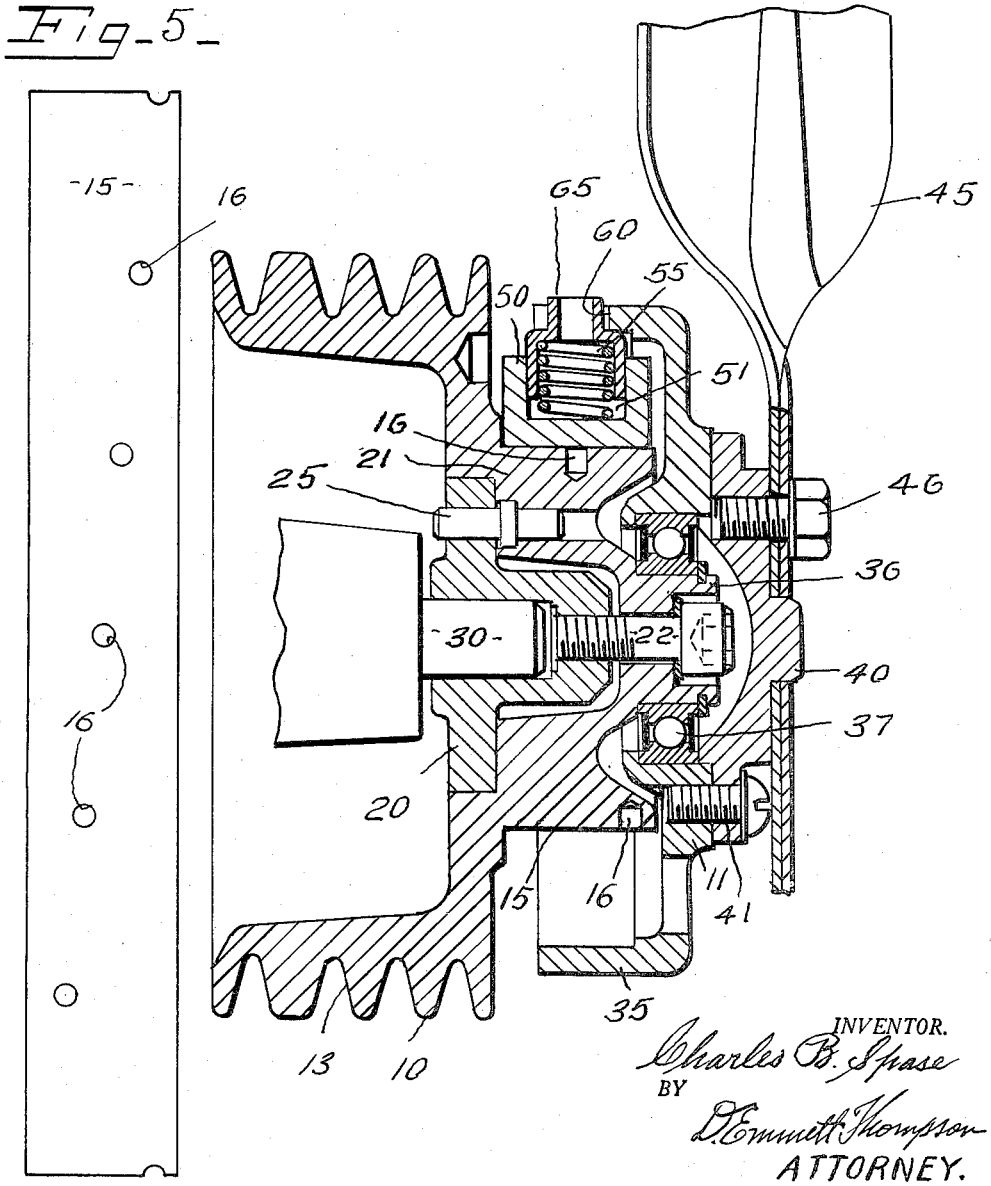
INVENTOR.
Charles B. Spase
BY
D. Emmett Thompson
ATTORNEY.

Dec. 9, 1958
C. B. SPASE
2,863,543
TORQUE METERING CLUTCH
Filed Feb. 14, 1957
2 Sheets-Sheet 2
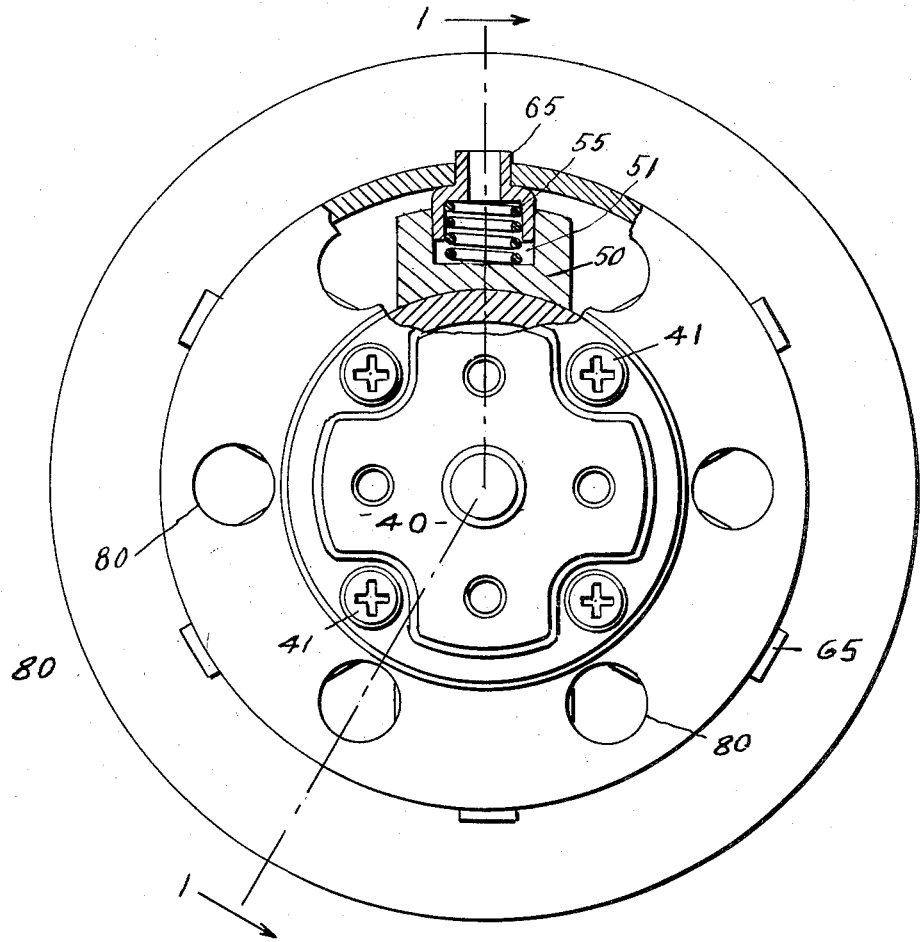
Fig-2-
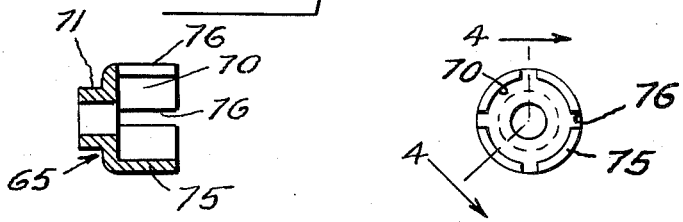
Fig-4-
Fig-3-
INVENTOR.
Charles B. Spase
BY
D. Emmett Thompson
ATTORNEY.

United States Patent Office 2,863,543
Patented Dec. 9, 1958

2,863,543

TORQUE METERING CLUTCH

Charles B. Spase, Syracuse, N. Y., assignor to Lipe-Rollway Corporation, Syracuse, N. Y., a corporation of New York Application February 14, 1957, Serial No. 640,233

6 Claims. (Cl. 192—104)

This invention relates to torque metering and speed limiting clutches of the type used in connection with driving automobile accessories, such as the fan, generator, etc., and functions to deliver a constant torque to the accessory and to limit the speed of the accessory to a predetermined speed regardless of the speed of the automobile.

Such clutches are noisy in operation and there is present the problem of dissipating relatively great amounts of heat.

This invention has as an object to provide a new and improved mounting for the friction shoes of such a clutch which will effectively dissipate heat from the friction shoes and actuating springs therefor, and also result in more quiet operation of the clutch.

Other objects will become apparent in the description of the invention.

The invention consists in the novel features and in the combinations and constructions hereinafter set forth and claimed.

In describing this invention, reference is had to the accompanying drawings in which like characters designate corresponding parts in all the views.

In the drawings:

Figure 1 is a cross sectional view of the invention taken on the line 1—1 of Figure 2.

Figure 2 is a front plan view, partly in section, of the invention.

Figure 3 is a top plan view of the drive member.

Figure 4 is a section taken on line 4—4 of Figure 3.

Figure 5 is a view showing a laid-out detail of the invention.

Referring to Figure 1, the torque metering clutch is composed of a driving member 10 and a driven member 11, and means for effecting a frictional engagement between the drive and driven members. The driving member is cylindrical in shape and has a plurality of grooves 13 on its external surface for the reception of a drive belt, or the like, for effecting a drive of the driving member. The driving member is further formed with a drum surface 15 having a plurality of radial bores 16 arranged in a staggered or spiral-like fashion upon the drum surface for a purpose hereinafter described.

As shown in Figure 1, the driving member, as here shown, includes an adapter 20 received in a hub portion 21 of the driving member 10. This adapter is fastened to the driving member by means of a bolt 22 and a pin 25. The adapter is mounted on the shaft 30 which, in this case, is the pump shaft. The drum surface 15 of the driving member is surrounded by and concentrically spaced from an annular flange 35 on the driven member 11. The driven member 11 is journalled on the boss 36 of the driving member by means of bearings 37. Mounted on the forward portion of the driven member 11 is a mounting plate 40, by fasteners 41. The mounting plate has, as is shown in Figure 1, a fan 45 mounted on the mounting plate 40 by fasteners 46.

The means for effecting a driving connection between the driving member and the driven member comprises a plurality of friction shoes 50 circumferentially spaced around the drum surface 15 of the driving member. Each of the friction shoes has a recess 51 in its outer surface for the reception of a compression spring 55. Mounted in a plurality of axially extending slots 60 in the annular flange 35 of the driven member are a plurality of drive members, or spring retainers 65. These drive members have a recessed inner end 70 for the reception of the tension spring. The outer end of the drive members is reduced, as at 71, to be received in the slots 60. The recessed inner end of the drive member 65 forms an annular wall 75 which is axially slotted at several places about its circumference, as indicated at 76.

It will be seen, from Figures 1 and 2, that the friction shoes 50 frictionally engage the drum surface 15 of the driving member 10, and are held in frictional engagement with the drum surface, by means of the compression springs 55 which are positioned in the recesses 70 of the drive members 65, thus effecting a driving engagement between the driving member 10 and the driven member 11 when the driving member is rotated. The slotted annular walls 75 of the drive members 65 have a relatively snug fit with the recesses 51 in the friction shoes 50. This snug fit insures a relatively noiseless connection between the friction shoes and the drive member, thus enhancing the operation of the clutch. The slots 76 in the annular wall 75 of the driving members permits these members to expand at elevated temperatures without effecting undue stress on the friction shoes 50 which are usually moulded or formed, from ceramic and/or organic materials.

The driven member 11 further has a plurality of apertures 80 circumferentially spaced about the mounting plate 40, see Figure 2. These apertures 80 allow air to be passed inwardly through the driven member 11 and around the friction shoes 50 to aid in the dissipation of the heat generated due to the frictional driving engagement caused by the friction shoes 50.

In Figure 5, the drum surface 15 of the driving member 10 has been laid out to show the positioning of the bores 16 in the surface. The radial bores 16, being arranged in a staggered or spiral-like fashion on the drum surface 15 will, in each revolution of the driving member, sweep or cover the entire surface of each friction shoe so as to act as collection pockets, picking up worn-off friction shoe particles as the bores pass over the surface of the friction shoes. The picked up particles will be expelled from the bores intermediate the friction shoes due to centrifugal force. Consequently, it will be seen that the bores 16 will aid in minimizing the wear on the friction shoes since the worn-off friction shoe particles act as abrasives and further operational noise of the device is lessened due to the fact that these particles, which cause some noise, are expelled from the device.

What I claim is:

1. A torque metering clutch comprising driving and driven members, said driving member having a hub formed with a drum surface thereon, said driven member having an annular flange encircling said drum in spaced relation thereto, a circular series of friction shoes positioned between said drum and flange and each of said shoes being formed with a recess, a drive member associated with each of said shoes, said drive member being formed with an inner expansible portion slidably mounted in the recess of the shoe and having an outer portion mounted in said flange and a compression spring mounted in each of said drive members for yieldingly urging said shoes into frictional engagement with the surface of said drum portion.

2. A torque metering clutch comprising driving and driven members, said driving member having a hub formed with a drum surface thereon, said driven member having an annular flange encircling said drum in spaced relation thereto, a plurality of friction shoes positioned between said flange and said drum surface, said flange being formed with a plurality of axially extending slots, each of said friction shoes having a recess formed therein, a friction shoe drive member associated with each friction shoe, each of said drive members having an expansible inner portion positioned in the recess formed in each of said shoes for sliding engagement therewith and each of said driving members having an outer portion mounted in said slots formed in the flange of said driven member.

3. A torque metering clutch comprising a driving member and a driven member, said driving member having a hub with a drum surface thereon, said driven member having an annular flange encircling said drum surface, a plurality of drive members mounted in said annular flange, each of said drive members carrying a spring, a plurality of friction shoes being yieldably urged into frictional engagement with said drum surface by said springs, each of said drive members extending partially into and laterally engaging said annular flange and partially into and laterally engaging said friction shoes and forming a drive connection between said flange and said shoes.

4. A torque metering clutch comprising a driving member having a boss, a driven member journalled for rotation on the boss on said driving member, said driving member having a friction drum surface, an annular flange on said driven member encircling said drum surface, a plurality of cylindrical spring retainer members extending inwardly from said flange, a plurality of friction shoes frictionally engaging said drum surface and each having a recess formed therein, the inner portion of each of said retainer members being slidably received in the recess formed in each of the friction shoes, said retainers forming a drive connection between said flange and said shoes, a compression spring mounted in the inner portion of each of said retainer members, said springs impinging upon said shoes to yieldingly urge said shoes into frictional engagement with said drum surface.

5. A torque metering clutch as set forth in claim 4 wherein the annular flange of said driven member is formed with slots extending axially thereof, and said spring retaining members are thimble-shaped having reduced outer end portions mounted in said slots, and the inner portions of said retainer members are formed with slots extending axially thereof.

6. A torque metering clutch comprising a driving member having a friction drum surface, a driven member journalled for rotation on said driving member and having an annular portion encircling said drum surface, a plurality of friction shoes carried by said flange for movement toward and from said drum surface, compression springs urging said shoes into frictional engagement with said drum surface, said drum surface being formed with a series of bores, said bores extending in a spiral path.

References Cited in the file of this patent

UNITED STATES PATENTS

| 928,679 | Mather | July 20, 1909 |
| 937,851 | Parker | Oct. 26, 1909 |
| 1,715,806 | Wersall | June 4, 1929 |
| 2,533,480 | Leininger et al. | Dec. 12, 1950 |
| 2,678,031 | Spase et al. | May 11, 1954 |
| 2,746,587 | Spase | May 22, 1956 |
| 2,799,586 | Schweiss | Jan. 29, 1957 |

FOREIGN PATENTS

| 483,244 | Italy | July 22, 1953 |

OTHER REFERENCES

Automotive Industries, Special Frictional Couplings Responsive to Speed and Torque (pp. 54, 55 and 116), Oct. 1, 1954.